(12) United States Patent
Yokota (10) Patent No.: US 11,174,662 B2
(45) Date of Patent: Nov. 16, 2021

(54) DRIVING APPARATUS AND DOOR LOCK (71) Applicant: GECOM CORPORATION, Greensburg, IN (US)

(72) Inventor: Yoshiaki Yokota, Farmington Hills, MI (US)

(73) Assignee: GECOM CORPORATION, Greensburg, IN (US)

(*) Notice: Subject to any disclaimer, the term of this patent is extended or adjusted under 35 U.S.C. 154(b) by 984 days.

(21) Appl. No.: 15/853,582

(22) Filed: Dec. 22, 2017

(65) Prior Publication Data
US 2018/0187459 A1 Jul. 5, 2018

Related U.S. Application Data (60) Provisional application No. 62/440,005, filed on Dec. 29, 2016.

(51) Int. Cl.
| F16H 57/10 | (2006.01) |
| E05B 81/24 | (2014.01) |
| E05B 81/20 | (2014.01) |
| E05B 81/38 | (2014.01) |
| E05B 81/14 | (2014.01) |
| E05B 81/06 | (2014.01) |
| E05B 79/20 | (2014.01) |
| F16H 57/02 | (2012.01) |
| F16H 57/039 | (2012.01) |

(52) U.S. Cl.
CPC .............. *E05B 81/25* (2013.01); *E05B 79/20* (2013.01); *E05B 81/06* (2013.01); *E05B 81/14* (2013.01); *E05B 81/20* (2013.01); *E05B 81/38* (2013.01); *F16H 57/10* (2013.01); *F16H 57/039* (2013.01); *F16H 2057/02034* (2013.01); *F16H 2057/02082* (2013.01)

(58) Field of Classification Search
CPC ... E05B 53/008; E05B 81/38; E05Y 2201/72; F16H 57/10; F16H 1/28
See application file for complete search history.

(56) References Cited

U.S. PATENT DOCUMENTS

| 2002/0119861 A1 | 8/2002 | Ishihara et al. |
| 2008/0053781 A1* | 3/2008 | Kita ................. E05F 15/646 192/84.1 |
| 2012/0204663 A1* | 8/2012 | Ishida ............... H02K 7/116 74/89.16 |

FOREIGN PATENT DOCUMENTS

JP        4617582 B2    1/2011

* cited by examiner

*Primary Examiner* — Jake Cook
(74) *Attorney, Agent, or Firm* — Foley & Lardner LLP (57) ABSTRACT A drive apparatus includes a sun gear, a ring gear, a carrier which supports planetary gears, a drive source which drives the ring gear as an input element, and fixing mechanism which fixes selectively one output element of the sun gear as a first output element and the carrier as a second output element so as not to rotate, and driving force is outputted from the other output element which is other than the one output element of the sun gear and the carrier fixed by the fixing mechanism.

6 Claims, 9 Drawing Sheets

DRIVING APPARATUS AND DOOR LOCK

TECHNICAL FIELD

The disclosure relates to a drive apparatus for use for a door lock of a vehicle and a door lock including this drive apparatus.

BACKGROUND

A door lock provided on a door of a vehicle such as a motor vehicle generally includes a lock apparatus which can hold the door of the vehicle in each of a fully closed state and a half closed state. Then, the lock apparatus has a latch which can move to each of a full latching position where the door of the vehicle is held in the fully closed state, a half latching position where the door of the vehicle is held in the half closed state and an unlatching position where the door of the vehicle can be opened and a ratchet which can move to each of a locking position where the ratchet locks the latch which is in the full latching position or the half latching position so as to prevent the latch from moving to the unlatching position and an unlocking position.

Then, as a door lock of this type, there is known a door lock which includes further a drive apparatus having a drive source such as an electric motor or the like for use in performing a releasing operation. In this lock apparatus, a ratchet is moved to an unlocking position by making use of driving force outputted from the drive apparatus, thereby allowing a latch to move towards an unlatching position, whereby a door of a vehicle is shifted from a fully closed state or a half closed state to an openable state.

In addition, a door lock described in Japanese Patent Publication No. 4617582 is designed to enable a closing operation in which a latch staying in a half latching position is caused to move to a full latching position by making use of driving force outputted from a drive apparatus so that a door of a vehicle is shifted from a half closed state to a fully closed state.

In the door lock described in Japanese Patent Publication No. 4617582, the drive apparatus has one output shaft, and driving force outputted from the one output shaft is transmitted to the latch to perform the closing operation. In order for the releasing operation to be carried out in this door lock, a mechanism for switching the driving force transmission target between the latch and a ratchet needs to be provided on a driving force transmission mechanism between the output shaft and the latch. To make this happen, there are fears that the configuration of the door lock becomes complex.

In addition, in performing the releasing operation in the door lock, the engagement between the latch and the ratchet is required to be released quickly, whereas in performing the closing operation, relatively high torque is required to rotate the latch to close the door of the vehicle fully. In a drive apparatus like a drive apparatus for a powered sliding door or a window regulator in which a single cable is wound around one drum and ends of the cable are made to function as outputs for two systems, when attempting to realize both the high speed required for the releasing operation and the high torque required for the closing operation by a single motor, there are fears that a large motor has to be provided.

SUMMARY

Illustrative aspects of the disclosure provide a drive apparatus of a planetary gear mechanism which can output selectively driving force of one system of driving forces of two systems by a simple and small configuration and to provide a door lock which makes a high speed requirement for a releasing operation compatible with a high torque requirement for a closing operation by using the drive apparatus.

A driving apparatus according to one illustrative aspect of the disclosure comprises: a sun gear; a ring gear disposed coaxially with the sun gear and on an outer side of the sun gear; a planetary gear disposed between the sun gear and the ring gear so as to mesh with the sun gear and the ring gear; a carrier, which supports the planetary gear, and which is disposed coaxially the sun gear and the ring gear; a drive source configured to drive an input element, the input element being one rotary element selected from a group of the sun gear, the ring gear and the carrier; and a fixing mechanism configured to fix selectively one of output elements of a first output element and a second output element so as not to rotate, the first output element and the second output element being two rotary elements other than the input element of the sun gear, the ring gear and the carrier, wherein the drive apparatus is configured to output driving force from the other output element that is other than the one of output elements of the first output element and the second output element fixed by the fixing mechanism.

A door lock according to one illustrative aspect of the disclosure comprises: the above-described drive apparatus; and a lock apparatus configured to hold a vehicle door in a fully closed state and a half closed state and to perform a releasing operation, in which the vehicle door staying in the fully closed state or the half closed state is shifted to an openable state, and a closing operation, in which the vehicle door staying in the half closed state is shifted to the fully closed state, wherein the lock apparatus comprises: a latch that is moveable to each of a full latching position where the latch holds the vehicle door in the fully closed state, a half latching position where the latch holds the vehicle door in the half closed state, and an unlatching position where the latch holds the vehicle door in the openable state; and a ratchet that is moveable to each of a locking position where the ratchet locks the latch which stays in the full latching position or the half latching position so as to prevent the latch from moving towards the unlatching position and an unlocking position, wherein in the releasing operation, the ratchet is moved from the locking position towards the unlocking position by means of the driving force which is outputted from the first output element of the drive apparatus, and wherein in the closing operation, the latch is moved from the half latching position towards the full latching position by means of the driving force which is outputted from the second output element of the drive apparatus.

According to the disclosure, it is possible to provide the drive apparatus of the planetary gear mechanism which can output selectively the driving force of one system of the driving forces of the two systems by the simple and small configuration and to provide the door lock which makes the high speed requirement for the releasing operation compatible with the high torque requirement for the closing operation by using the drive apparatus.

DETAILED DESCRIPTION

Figure 1:
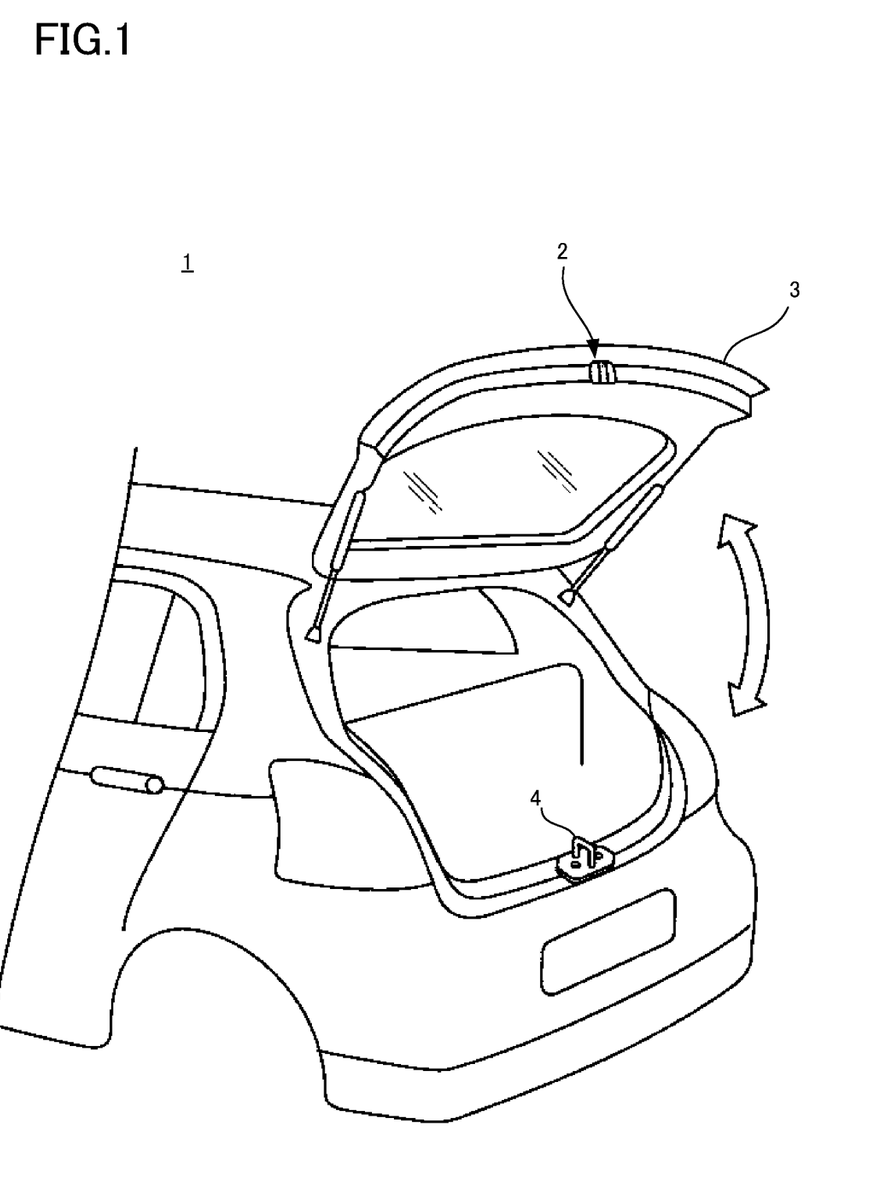
FIG. 1 is a perspective view of an example of a vehicle which installs a door lock for description of an illustrative embodiment of the disclosure.

FIG. 1 is a perspective view of an example of a vehicle which installs a door lock for description of an illustrative embodiment of the disclosure.

A vehicle 1 shown in FIG. 1 includes a vehicle door 3 which installs a door lock 2. In this example, the vehicle door 3 is a hinged lifting back access door. A striker 4 is provided on a lower edge portion, extending in a vehicle's width or transverse direction, of edge portions of an opening portion at a rear end of the vehicle which is closed by the vehicle door 3. The door lock 2 holds the vehicle door 3 in a fully closed state and a half closed state by locking the striker 4.

The door lock 2 includes a lock apparatus which locks the striker 4 and a drive apparatus which drives the lock apparatus. Firstly, the lock apparatus will be described.

Figure 2A:
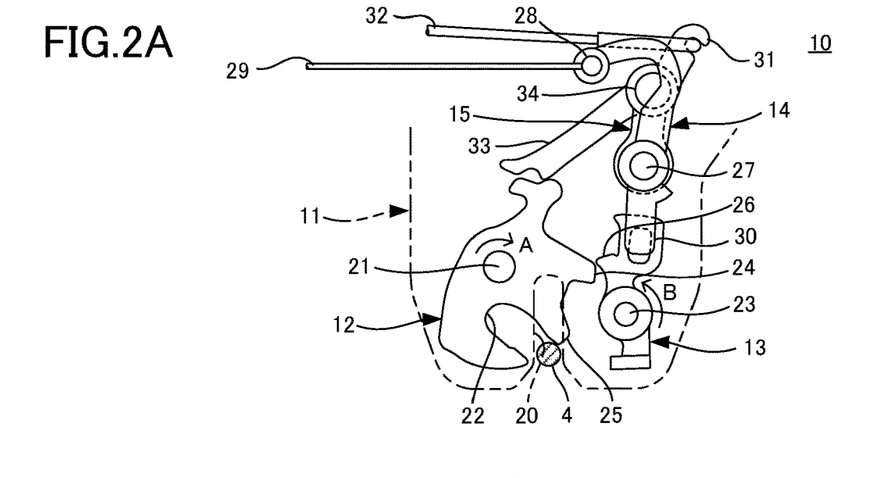
FIG. 2A is a schematic diagram of an example of a lock apparatus for the door lock shown in FIG. 1, showing a state in which a vehicle door can be opened.
Figure 2B:
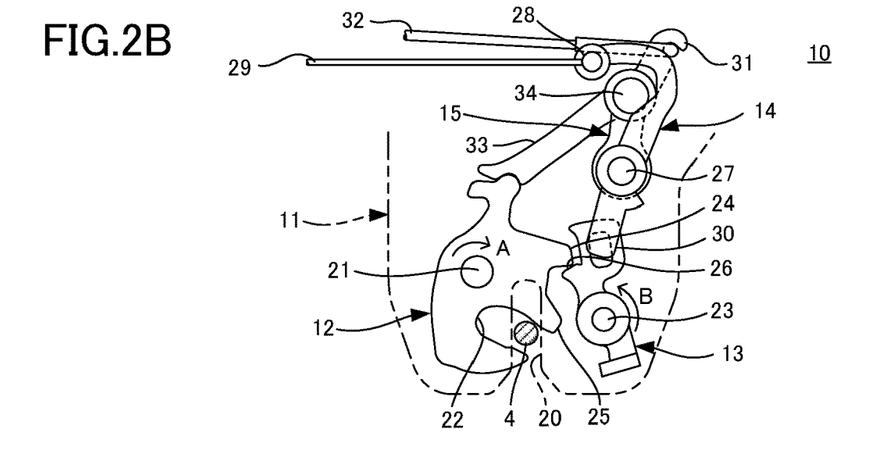
FIG. 2B is a schematic diagram of the lock apparatus showing a state in which the vehicle door is half closed.
Figure 2C:
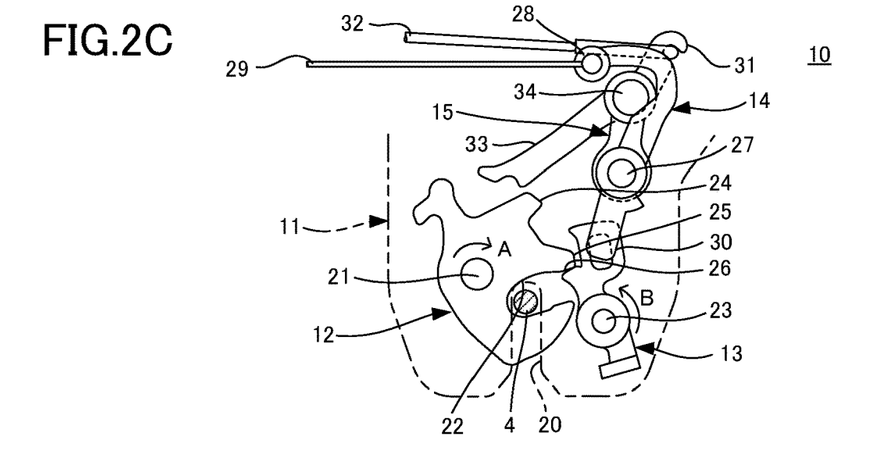
FIG. 2C is a schematic diagram of the lock apparatus showing a state in which the vehicle door is fully closed.

FIGS. 2A to 2C show the configuration of an example of the lock apparatus.

A lock apparatus 10 shown therein includes a cover plate 11, a latch 12, a ratchet 13, a releasing lever 14 and a closing lever 15.

The cover plate 11 is a metallic plate member made of metallic material such as steel. A striker entering groove 20 is formed in the cover plate 11, so that the striker 4 enters the striker entering groove 20 as the vehicle door 3 is closed.

The latch 12 is supported rotatably by a latch shaft 21 which is fixed to the cover plate 11 and can move to each of an unlatching position (refer to FIG. 2A), a half latching position (refer to FIG. 2B) and a full latching position (refer to FIG. 2c). The latch 12 is biased in a direction indicated by an arrow A towards the unlatching position by a torsion spring, not shown.

The latch 12 has a striker engaging groove 22 which can be brought into engagement with the striker 4. When the latch 12 stays in the unlatching position, an entrance of the striker engaging groove 22 is disposed to overlap the striker entering groove 20 in the cover plate 11. The striker 4 which enters the striker entering groove 20 as the vehicle door 3 is closed is received in the striker engaging groove 22 in the latch 12 which stays in the unlatching position.

Then, the latch 12 is pressed against by the striker 4 which comes into abutment with a side surface of the striker engaging groove 22 and is then rotated from the unlatching position towards the full latching position by way of the half latching position. When the latch 12 is disposed in the half latching position and is then disposed in the full latching position, the entrance of the striker engaging groove 22 is disposed to be out of alignment with the striker entering groove 20.

The ratchet 13 is supported rotatably by a ratchet shaft 23 which is fixed to the cover plate 11 and can move to each of an unlocking position (refer to FIG. 2A) and a locking position (refer to FIGS. 2B and 2C). Then, the ratchet 13 is biased in a direction indicated by an arrow B towards the locking position by a torsion spring, not shown.

The ratchet 13 has a locking portion 26 which can be brought into engagement with a half latching engagement portion 24 and a full latching engagement portion 25 which are provided on an outer circumferential portion of the latch 12.

When the latch is disposed in the half latching position, the locking portion 26 of the ratchet 13 which is disposed in the locking position is brought into engagement with the half latching engagement portion 24, whereby the latch 12 is prevented from rotating towards the unlatching position by means of the engagement of the half latching engagement portion 24 with the locking portion 26. This holds the vehicle door 3 in the half closed state.

When the latch 12 is disposed in the full latching position, the locking portion 26 of the ratchet 13 which is disposed in the locking position is brought into engagement with the full latching engagement portion 25, whereby the latch 12 is prevented from rotating towards the unlatching position by means of the engagement of the full latching engagement portion 25 with the locking portion 26. This holds the vehicle door 3 in the fully closed state.

The releasing lever 14 is supported rotatably by a lever shaft 27 which is fixed to the cover plate 11. A cable connecting portion 28 is provided on the releasing lever 14, and a releasing cable 29 (one example of a first output cable), which is configured to rotate the releasing lever 14, is connected to the cable connecting portion 28. Then, the releasing lever 14 has a linker portion 30 which is provided on an opposite end to the end where the cable connecting portion 28 is provided across the lever shaft 27, and the linker portion 30 is connected to the ratchet 13.

The closing lever 15 is supported by the lever shaft 27 so as to rotate independently of the releasing lever 14. A cable connecting portion 31 is provided on the closing lever 15, and a closing cable 32 (one example of a second output cable), which is configured to rotate the closing lever 15, is connected to the cable connecting portions 31. Then, the closing lever 15 has a knocking bar 33 which can be brought into engagement with the latch 12, and the knocking bar 33 is supported rotatably by a rivet 34 which is fixed to the closing lever 15 between the lever shaft 27 and the cable connecting portion 31.

Figure 3A:
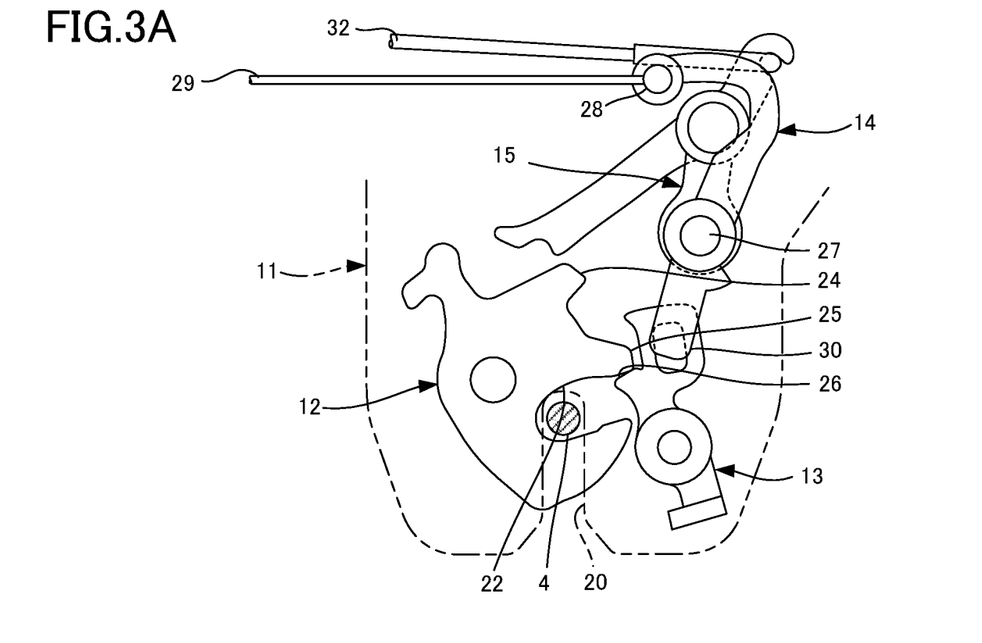
FIG. 3A is a schematic diagram showing a releasing operation of the lock apparatus.
Figure 3B:
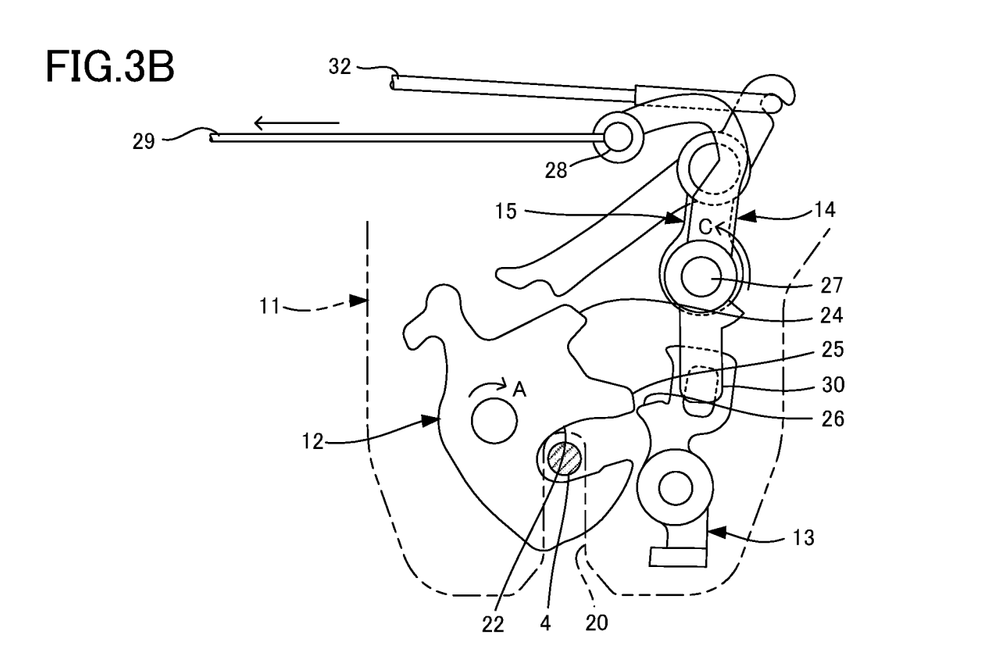
FIG. 3B is a schematic diagram showing the releasing operation of the lock apparatus.

FIGS. 3A and 3B show a releasing operation of the lock apparatus 10. As shown in FIG. 3A, the latch 12 stays in the full latching position, and the ratchet 13 stays in the locking position. The full latching engagement portion 25 of the latch 12 is in engagement with the locking portion 26 of the ratchet 13, and the vehicle door 3 is held in the fully closed state.

As shown in FIG. 3B, when the releasing cable 29 is pulled on, the releasing lever 14 is rotated about the lever shaft 27 in a direction indicated by an arrow C. The ratchet 13, which is linked with the releasing lever 14 by the linker portion 30, is moved from the locking position to the unlocking position in response to the rotation of the releasing lever 14. The engagement of the full latching engagement portion 25 with the locking portion 26 is released as a result of the ratchet 13 being moved to the unlocking position, whereby the latch 12 can rotate in the direction indicated by the arrow A towards the unlatching position. This allows the vehicle door 3 to be opened.

This will be similar when the latch 12 stays in the half latching position and the ratchet 13 stays in the locking position whereby the half latching engagement portion 24 of the latch 12 is in engagement with the locking portion 26 of the ratchet 13. Thus, the engagement of the half latching engagement portion 24 with the locking portion 26 is released by the releasing cable 29 being pulled on, whereby the vehicle door 3 is allowed to be opened.

Figure 4A:
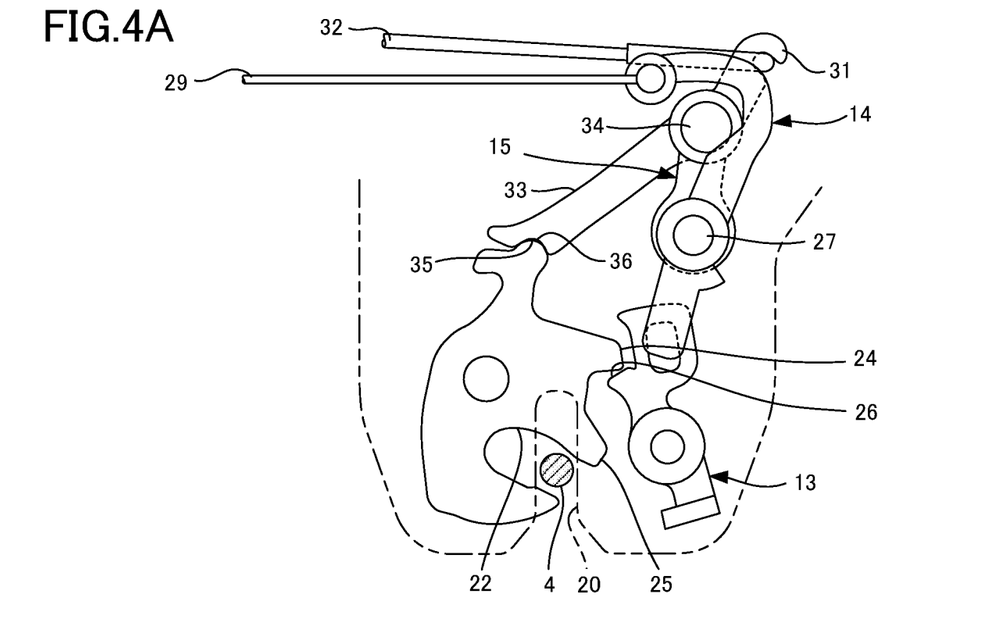
FIG. 4A is a schematic diagram showing a closing operation of the lock apparatus.
Figure 4B:
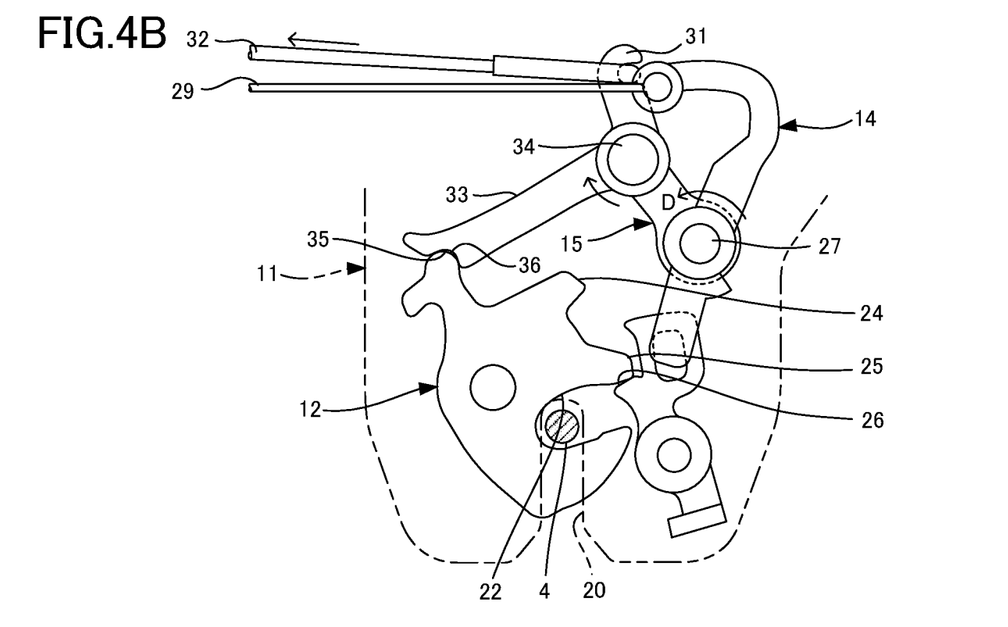
FIG. 4B is a schematic diagram showing the closing operation of the lock apparatus.

FIGS. 4A and 4B show a closing operation of the lock apparatus 10.

As shown in FIG. 4A, the latch 12 stays in the half latching position, and the ratchet 13 stays in the locking position. The half latching engagement portion 24 of the latch 12 is in engagement with the locking portion 26 of the ratchet 13, whereby the vehicle door 3 is held in the half closed state. As this is occurring, a pressing portion 35 which is provided at a distal end of the knocking bar 33 is in contact with a pressed portion 36 which is provided on the outer circumferential portion of the latch 12.

As shown in FIG. 4B, when the closing cable 32 is pulled on, the closing lever 15 is rotated about the lever shaft 27 in a direction indicated by an arrow D. The knocking bar 33, which is connected to the closing lever 15 via the rivet 34, is rotated about the lever shaft 27 together with the closing lever 15. The contact of the pressing portion 35 with the pressed portion 36 is maintained by the knocking bar 33 which is rotated together with the closing lever 15 being rotated about the rivet 34 as required, whereby the latch 12 is pressed by the knocking bar 33 in response to the rotation of the knocking bar 33 about the lever shaft 27 to thereby be moved from the half latching position to the full latching position.

The ratchet 13 is pushed once by the latch 12 to thereby be moved from the locking position to the unlocking position in the process of the latch 12 being moved from the half latching position to the full latching position. Then, the latch 12 is biased by means of the torsion spring, not shown, at the same time as the latch 12 is disposed in the full latching position to thereby be disposed in the locking position again. This brings the full latching engagement portion 25 of the latch 12 into engagement with the locking portion 26 of the ratchet 13, whereby the vehicle door 3 is held in the fully closed state.

In the releasing operation and the closing operation which are described above, the releasing cable 29 and the closing cable 32 are pulled by the drive apparatus of the door lock 2. Hereinafter, the drive apparatus of the door lock 2 will be described.

Figure 5:
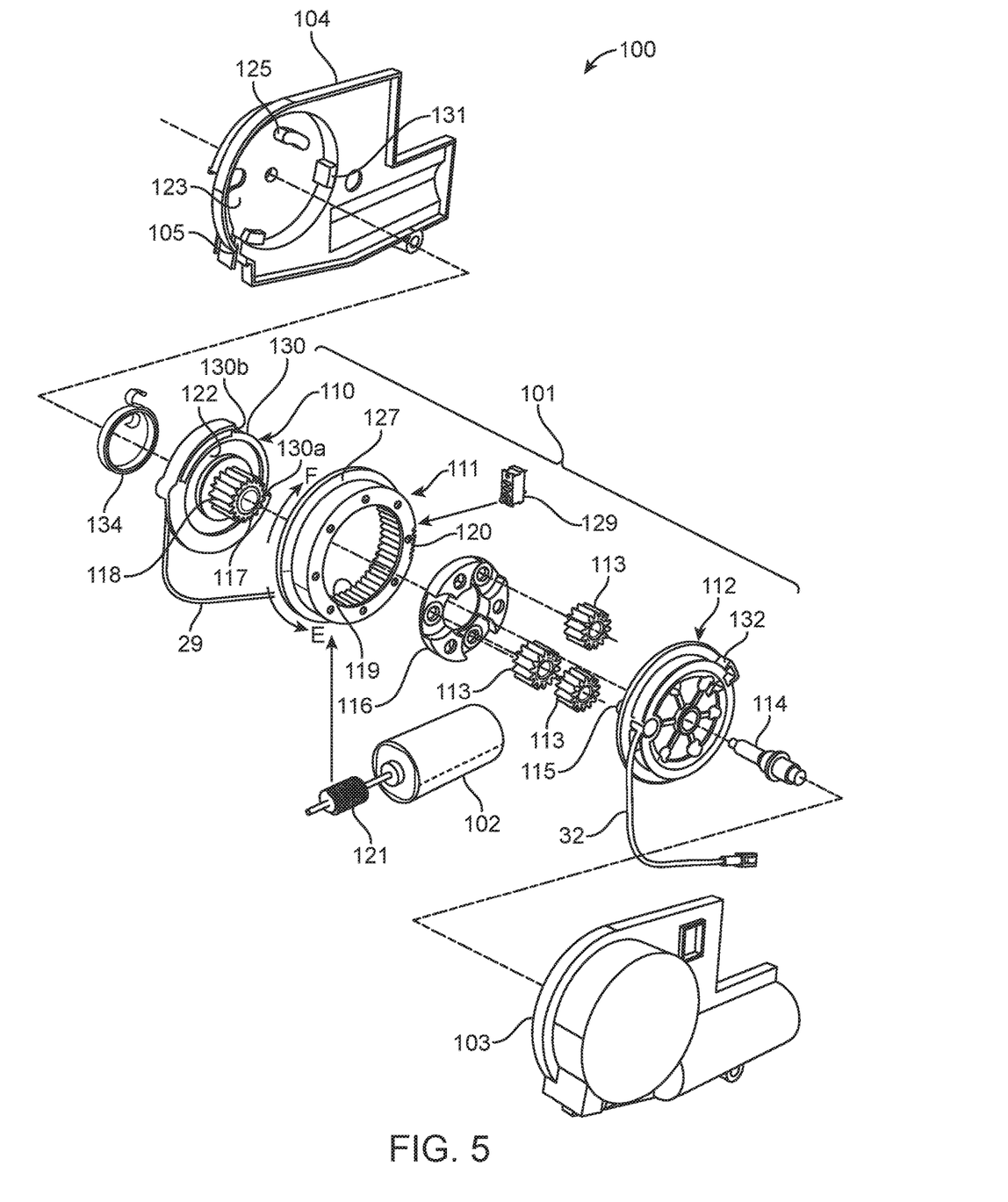
FIG. 5 is an exploded perspective view of an example of a drive apparatus of the door lock shown in FIG. 1.
Figure 6:
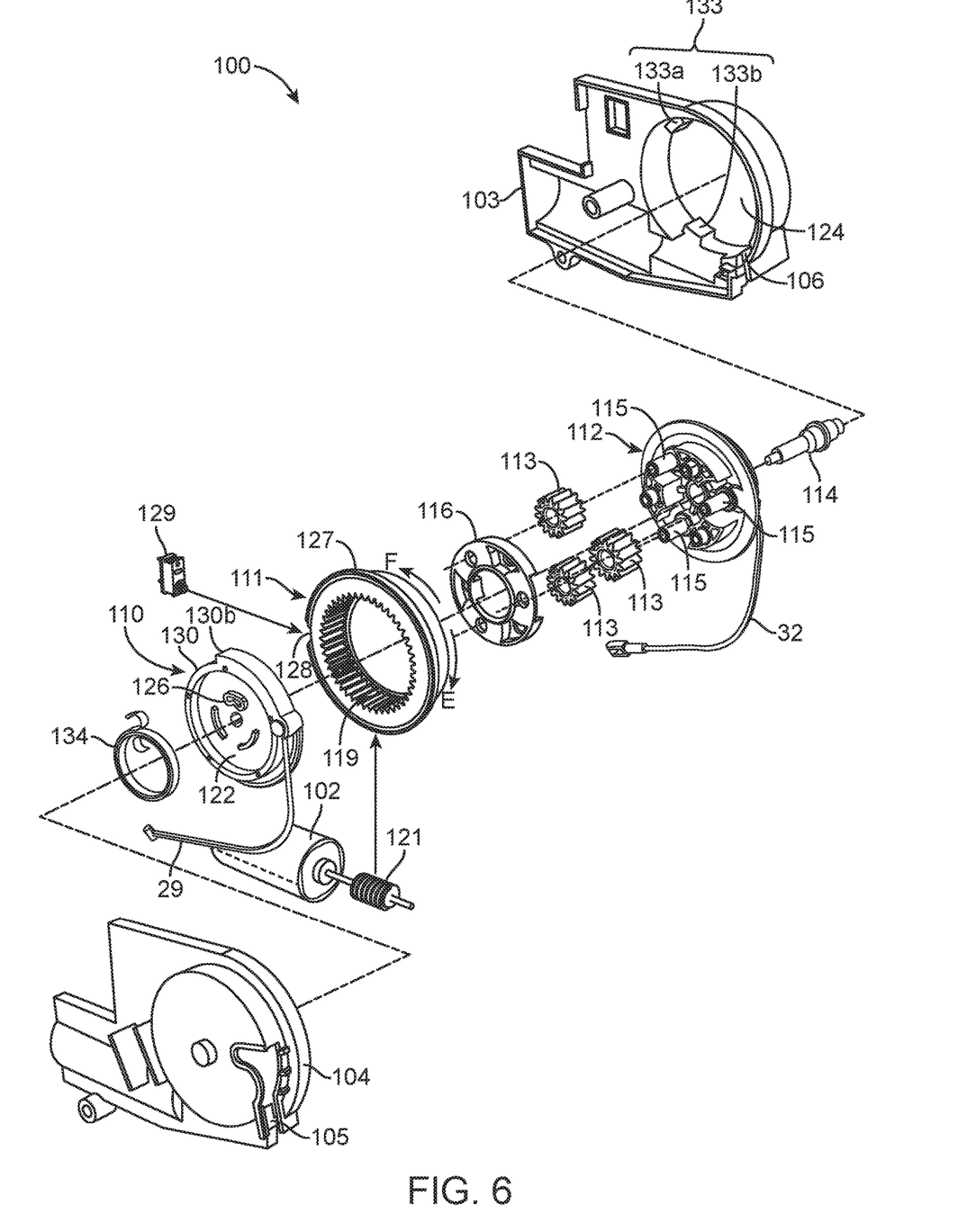
FIG. 6 is an exploded perspective view of the drive apparatus.

FIGS. 5 and 6 show an example of the drive apparatus of the door lock 2.

A drive apparatus 100 includes a planetary gear mechanism 101, a motor 102 which functions as a drive source for driving the planetary gear mechanism 101, and a case 103 and a cover 104 which function as a housing which accommodates therein the planetary gear mechanism 101 and the motor 102. Then, the planetary gear mechanism 101 includes a sun gear 110 (one example of a first output element), a ring gear 111 (one example of an input element), a carrier 112 (one example of a second output element), and a plurality of planetary gears 113.

The sun gear 110 is supported rotatably by a gear shaft 114 which is fixed to the case 103 and the cover 104. The ring gear 111 is disposed concentrically with the sun gear 110 and on a radially outer side of the sun gear 110. The carrier 112 is disposed in an axial direction of the gear shaft 114 and adjacent to the gear shaft 114 and is supported rotatably by the gear shaft 114.

A plurality of planetary gear shafts 115 are provided in the carrier 112 at intervals in a circumferential direction. The planetary gears 113 are supported individually on the planetary gear shafts 115 in a rotatable fashion and are held to the carrier 112 while being held between the carrier 112 and a carrier plate 116 which is assembled to the carrier 112. Then, the planetary gears 113 are disposed between the sun gear 110 and the ring gear 111 while meshing with external teeth 118 which are provided on an outer circumferential surface of a gear portion 117 of the sun gear 110 and internal teeth 119 which are provided on an inner circumferential surface of the ring gear 111.

The one rotary element which is selected from a group of the sun gear 110, the ring gear 111 and the carrier 112 is referred to as an input element of the planetary gear mechanism 101, and the planetary gear mechanism 101 is driven by driving force of the motor 102 being inputted into this input element. In this illustrative embodiment, the ring gear 111 constitutes the input element. External teeth 120 are provided on an outer circumferential surface of the ring gear 111 so as to mesh with a worm gear 121 which is attached to an output shaft of the motor 102. On the other hand, in the rotary elements, the sun gear 110 and the carrier 112 other than the ring gear 111 which functions as the input element are referred to as output elements of the planetary gear mechanism 101.

The sun gear 110, which functions as a first output element, has a flange portion 122 which is provided adjacent to the gear portion 117 in the axial direction. The releasing cable 29 is connected to a radially outward edge portion of the flange portion 122, and the releasing cable 29 is led out of the cover 104 through an outlet port 105 which is provided in the cover 104. The releasing cable 29 is pulled on in response to a rotation of the sun gear 110. When the releasing cable 29 is so pulled on, the ratchet 13 is moved from the locking position to the unlocking position by means of the releasing operation of the lock apparatus 10 (refer to FIGS. 3A and 3B).

The closing cable 32 is connected to a radially outward edge portion of the carrier 112, which functions as a second rotary element, and the closing cable 32 is let out of the case 103 through an outlet port 106 which is provided in the case 103. The closing cable 32 is pulled on in response to a rotation of the carrier 112. When the closing cable 32 is pulled on, the latch 12 is moved from the half latching position to the full latching position by means of the closing operation of the lock apparatus 10 (refer to FIGS. 4A and 4B).

The drive apparatus 100 includes further a fixing mechanism which selectively fixes one of the output elements which are the sun gear 110 and the carrier 112 so as not to rotate. By fixing one output element, driving force is outputted from the other output element, that is, the other output element is rotated. Then, the output element to be fixed can be switched between the sun gear 110 and the carrier 112, whereby in the case of the carrier 112 being fixed, the sun gear 110 is rotate, whereas in the case of the sun gear 110 being fixed, the carrier 112 is rotated.

Here, a rotational direction of the ring gear 111 when the motor 102 rotates forwards is referred to as a first direction E when the sun gear 110, the ring gear 111 and the carrier 112 rotate, and an opposite rotational direction to the first direction E is referred to as a second direction F. Then, how the sun gear 110 and the carrier 112 rotate when the ring gear 111 rotates will briefly be described below.

Firstly, in the event that the carrier 12 is fixed so as not to rotate, when the ring gear 111 is rotated in the first direction E, the planetary gears 113 which are supported on the carrier 112 are rotated on their own axes. Although the sun gear 110 which meshes with the planetary gears 113 is also rotated, since the planetary gears 113 are interposed between the ring gear 111 and itself, the sun gear 110 is rotated in the second direction F. On the contrary, when the ring gear 111 is rotated in the second direction F, the sun gear 110 is rotated in the first direction E.

On the other hand, in the event that the sun gear 110 is fixed so as not to rotate, when the ring gear 11 is rotated in the first direction E, the planetary gears 113 are caused to walk around along an outer circumference of the gear portion 117 of the sun gear 110 in the first direction E, whereby the carrier 112 which supports the planetary gears 113 is rotated in the first direction E. On the contrary, when the ring gear 111 is rotated in the second direction F, the carrier 112 is rotated in the second direction F.

The drive apparatus 100 includes a first engagement portion 130 which is provided on the flange portion 122 of the sun gear 110 as the fixing mechanism described above, a first stopper 131 which is provided on the cover 104 which is placed over the flange portion 122, a second engagement portion 132 which is provided on the carrier 112, a second stopper 133 which is provided on the case 103, and a power spring 134.

A substantially arc-shaped cutout portion is provided on a radially outward edge portion of the flange portion 122 of the sun gear 110, and the first engagement portion 130 is made up of this cutout portion. The first engagement portion 130 has a first abutment surface 130a which is directed in the first direction E and a second abutment surface 130b which is directed in the second direction F. On the other hand, a substantially circular recess portion 123 is provided on the cover 104 so as to accommodate the flange portion 122, and the first stopper 131 is provided on an inner circumferential surface of the recess portion 123 so as to project therefrom. Then, the first stopper 131 is disposed within the first engagement portion 130 which is the cutout portion.

The first stopper 131 moves relatively in a circumferential direction within the first engagement portion 130 in response to a rotation of the sun gear 110 to thereby be brought into abutment with the first abutment surface 130a and the second abutment surface 130b. The sun gear 110 is prevented from rotating in the first direction E by means of the abutment of the first stopper 131 with the first abutment surface 130a, whereas the sun gear 110 is prevented from rotating in the second direction F by means of the abutment of the first stopper 131 with the second abutment surface 130b.

The second engagement portion 132 is provided on an outer circumferential surface of the carrier 112 so as to project therefrom. On the other hand, a substantially circular recess portion 124 is provided on the case 103 so as to accommodate the carrier 112, and the second stopper portion 133 is made up of a first abutment portion 133a and a second abutment portion 133b which are provided on an inner circumference of the recess portion 124. The first abutment portion 133a and the second abutment portion 133b are disposed so as to be spaced circumferentially away from each other along the inner circumferential surface of the recess portion 124, and the second engagement portion 132 is disposed between the first abutment portion 133a and the second abutment portion 133b.

The second engagement portion 132 moves circumferentially between the first abutment portion 133a and the second abutment portion 133b in response to a rotation of the carrier 112 to thereby be brought into abutment with the first abutment portion 133a and the second abutment portion 133b. The carrier 112 is prevented from rotating in the first direction E by means of the abutment of the second engagement portion 132 with the first abutment portion 133a, whereas the carrier 112 is prevented from rotating in the second direction F by means of the second engagement portion 132 with the second abutment portion 133b.

The power spring 134 is disposed so as to be held between the flange portion 122 of the sun gear 110 and a bottom plate of the recess portion 123 of the cover 104 which accommodates the flange portion 122. Then, one end portion of the power spring 134 is locked on a spring locking portion 125 which is provided on a bottom portion of the recess portion 123, while the other end portion of the power spring 134 is locked on a spring locking portion 126 which is provided on the flange portion 122. The sun gear 110 to which one end of the power spring 134 is fastened is rotationally biased in the first direction E by the power spring 134.

FIGS. 7A to 7C, FIGS. 8A to 8C and FIGS. 9A to 9C show operations of the drive apparatus 100.

Figure 7A:
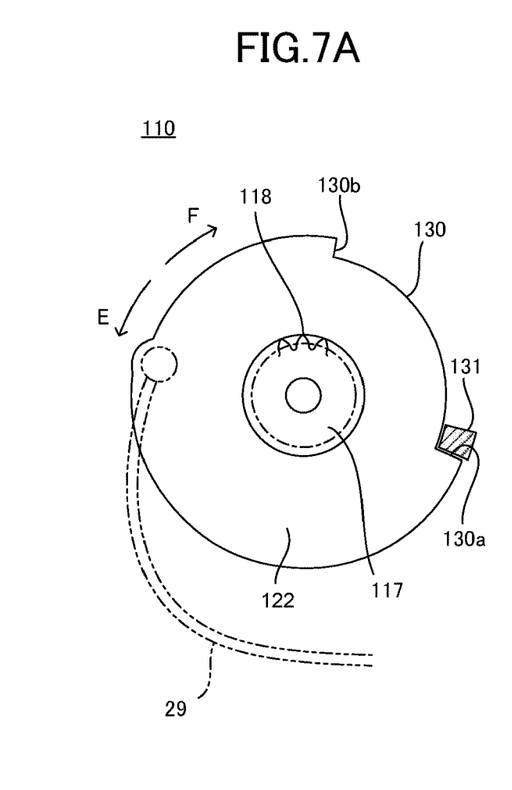
FIG. 7A is a schematic diagram showing an operation of the drive apparatus.
Figure 7B:
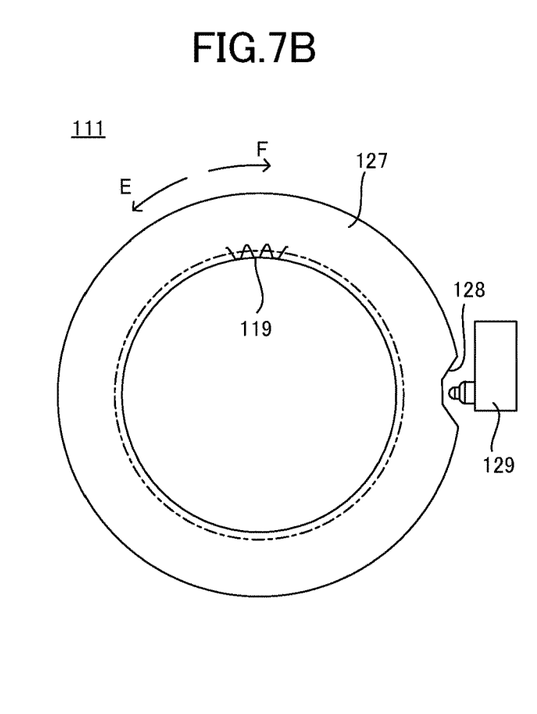
FIG. 7B is a schematic diagram showing an operation of the drive apparatus.
Figure 7C:
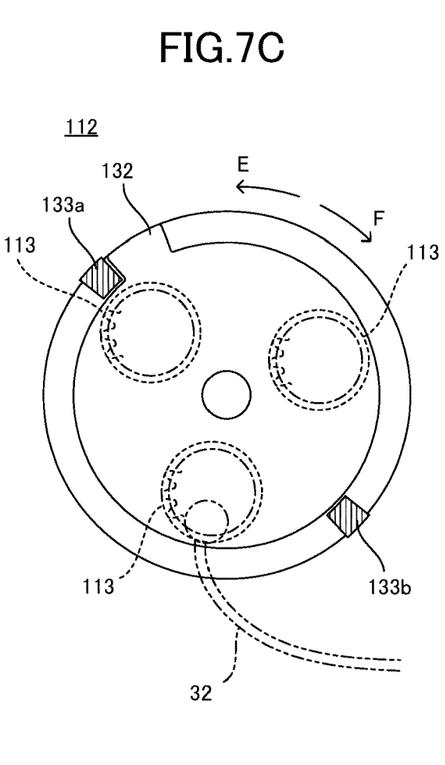
FIG. 7C is a schematic diagram showing an operation of the drive apparatus.

Firstly, FIGS. 7A to 7C show the drive apparatus 100 which stays in a waiting state.

As shown in FIG. 7A, when the drive apparatus 100 is staying in the waiting state, the first abutment surface 130a of the first engagement portion 130 of the sun gear 110 is in abutment with the first stopper 131 of the cover 104, whereby the sun gear 110 is prevented from rotating in the first direction E but is permitted to rotate in the second direction F.

In addition, as shown in FIG. 7C, when the drive apparatus 100 is staying in the waiting state, the second engagement portion 132 of the carrier 112 is in abutment with the first abutment portion 133a of the second stopper 133 of the case 103, whereby the carrier 112 is prevented from rotating in the first direction E but is permitted to rotate in the second direction F.

A position detecting notched portion 128 is provided on a radially outward edge portion of a flange portion 127 of the ring gear 111. As shown in FIG. 7B, when the drive apparatus 100 is staying in the waiting state, the notched portion 128 is disposed so as to face a switch 129, and the switch 129 stays in a non-depressed state.

A rotational angle of the ring gear 111 at which the notched portion 128 is disposed to face the switch 129 is referred to as a waiting position of the ring gear 111, and the position (the waiting position or a non-waiting position) of the ring gear 111 is detected by a motor controller, not shown, based on the state (a depressed state or the non-depressed state) of the switch 129.

Figure 8A:
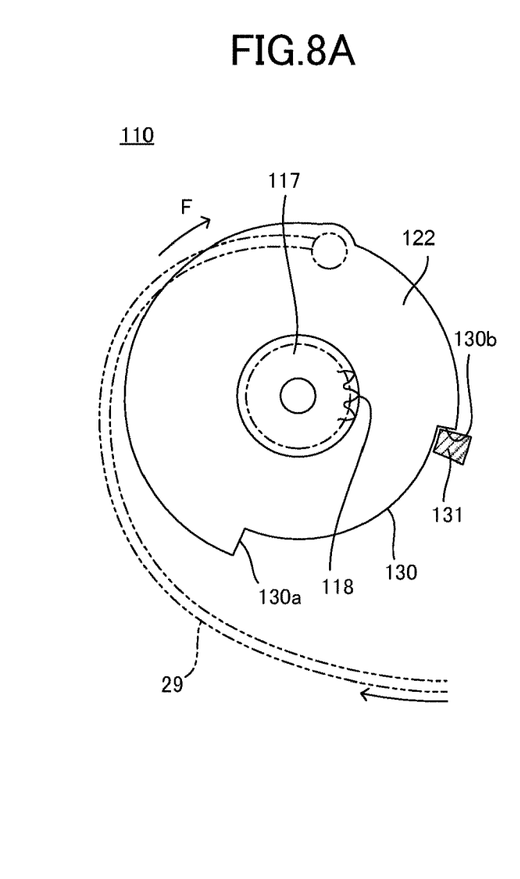
FIG. 8A is a schematic diagram showing an operation of the drive apparatus.
Figure 8B:
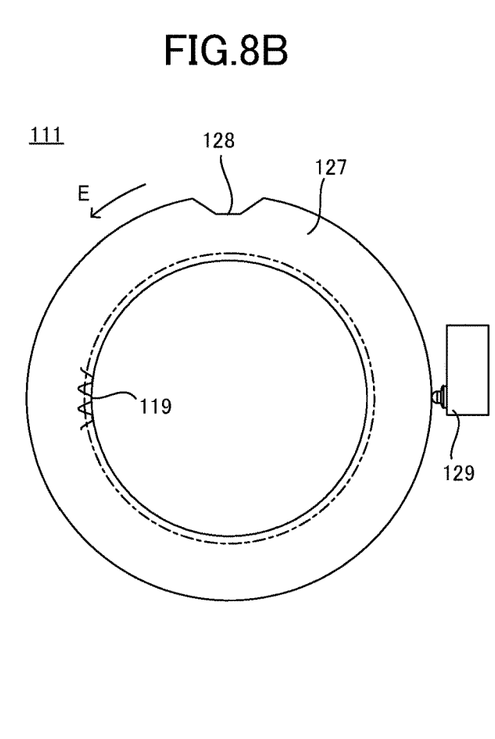
FIG. 8B is a schematic diagram showing an operation of the drive apparatus.
Figure 8C:
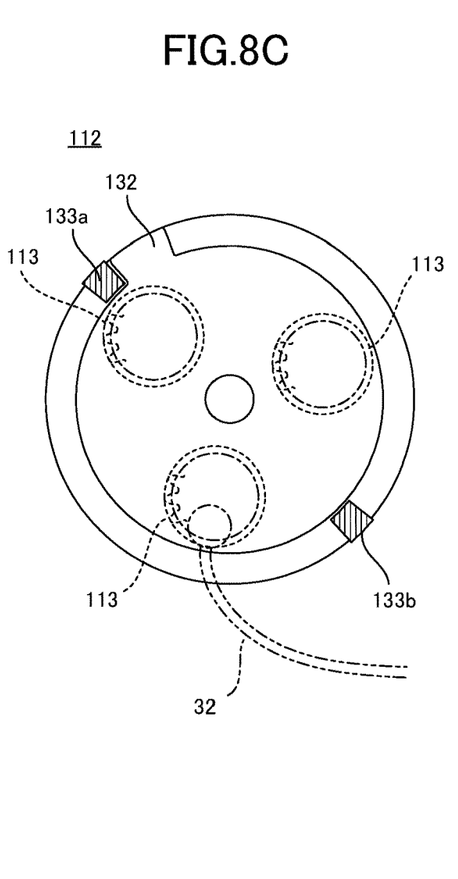
FIG. 8C is a schematic diagram showing an operation of the drive apparatus.

FIGS. 8A to 8C show an operation of the drive apparatus 100 when driving force is outputted from the sun gear 110 to enable the lock apparatus 10 to perform the releasing operation described above.

When the lock apparatus 10 performs the releasing operation, the motor 102 is rotated forwards by the motor controller, and as shown in FIG. 8B, the ring gear 111 is rotated in the first direction E in response to the forward rotation of the motor 102.

As has been described above, although the carrier 112 is rotated in the first direction E as the ring gear 111 rotates in the first direction E, when the drive apparatus 100 is staying in the waiting state, the carrier 112 is prevented from rotating in the first direction E. Consequently, as shown in FIG. 8C, the carrier 112 is fixed so as not to rotate.

On the other hand, the sun gear 110 is rotated in the second direction F as the ring gear 111 rotates in the first direction E, and when the drive apparatus 100 is staying in the waiting state, the sun gear 110 can rotate in the second direction F. Consequently, as shown in FIG. 8A, the sun gear 110 is rotated in the second direction F until the second abutment surface 130b of the first engagement portion 130 and the first stopper 131 are brought into abutment with each other as the ring gear 111 rotates in the first direction E, whereby the releasing cable 29 is pulled on in response to the rotation of the sun gear 110.

The motor 102 is rotated reversely by the motor controller after the releasing cable 29 is pulled on, causing the rock apparatus 10 to perform the releasing operation. The ring gear 111 is rotated in the second direction F in response to the reverse rotation of the motor 102, whereby the ring gear 111 is restored to its waiting position as shown in FIG. 7B. The sun gear 110 is rotated in the first direction E in response to the rotation of the ring gear 111 in the second direction F, whereby the sun gear 110 is restored to its waiting position as shown in FIG. 7A.

Here, the carrier 112 is rotated in the second direction F as the ring gear 111 rotates in the second direction F, and in the state shown in FIG. 8C, the carrier 112 can rotate in the second direction F. However, the sun gear 110 is rotationally biased in the first direction E by the power spring 134, and therefore, torque required for the sun gear 110 to rotate in the first direction E is smaller than torque required for the carrier 112 to rotate in the second direction F. Due to this, in returning to its waiting position, when the ring gear 111 rotates in the second direction F, the carrier 112 is not rotated, while the sun gear 110 is rotated in the first direction E.

Figure 9A:
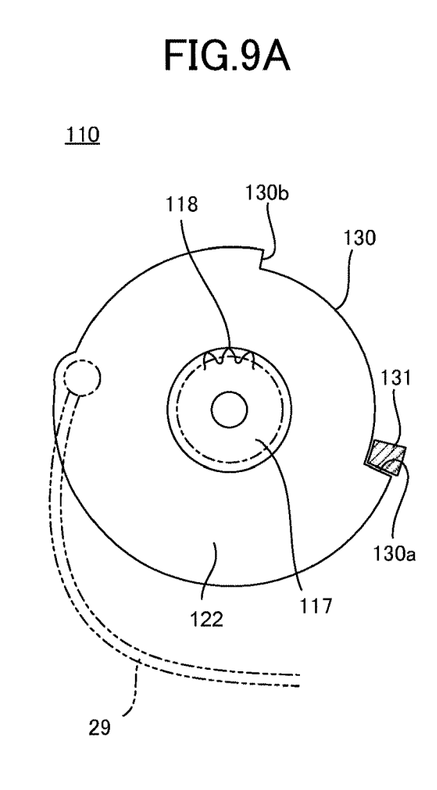
FIG. 9A is a schematic diagram showing an operation of the drive apparatus.
Figure 9B:
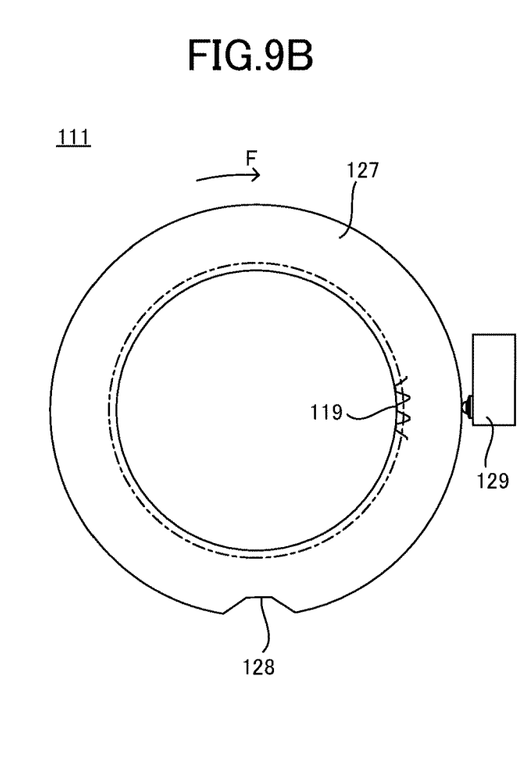
FIG. 9B is a schematic diagram showing an operation of the drive apparatus.
Figure 9C:
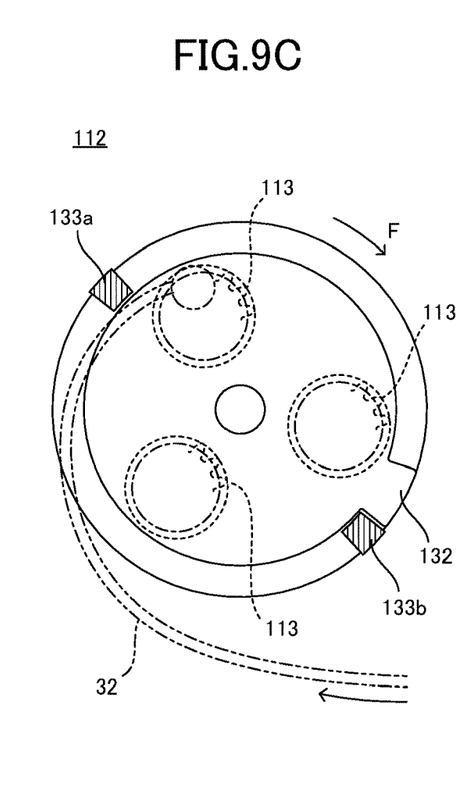
FIG. 9C is a schematic diagram showing an operation of the drive apparatus.

FIGS. 9A to 9C show the drive apparatus 100 when driving force is outputted from the carrier 112 to enable the lock apparatus 10 to perform the closing operation described above.

When the rock apparatus 10 performs the closing operation, the motor 102 is reversed by the motor controller, and as shown in FIG. 9B, the ring gear 111 is rotated in the second direction F in response to the reverse rotation of the motor 102.

As has been described above, although the sun gear 110 is rotated in the first direction E as the ring gear 111 rotates in the second direction F, when the drive apparatus 100 is staying in the waiting state, the sun gear 110 is prevented from rotating in the first direction E. Consequently, as shown in FIG. 9A, the sun gear 110 is fixed so as not to rotate.

On the other hand, the carrier 112 is rotated in the second direction F as the ring gear 111 rotates in the second direction F, and when the drive apparatus 100 is staying in the waiting state, the carrier 112 can rotate in the second direction F. Consequently, as shown in FIG. 9C, the carrier 112 is rotated in the second direction F until the second engagement portion 132 and the second abutment portion 133b of the second stopper 133 are brought into abutment with each other in response to the rotation of the ring gear 111 in the second direction F, whereby the closing cable 32 is pulled on in response to the rotation of the carrier 112.

The motor 102 is rotated forwards by the motor controller after the closing cable 32 is pulled on, causing the rock apparatus 10 to perform the closing operation. The ring gear 111 is rotated in the first direction E in response to the forward rotation of the motor 102, whereby the ring gear 111 is restored to its waiting position as shown in FIG. 7B. The carrier 112 is rotated in the first direction E in response to the rotation of the ring gear 111 in the first direction E, whereby the carrier 112 is restored to its waiting position as shown in FIG. 7C.

Here, the sun gear 110 is rotated in the second direction F as the ring gear 111 rotates in the first direction E, and in the state shown in FIG. 9A, the sun gear 110 can rotate in the second direction F. However, the sun gear 110 is rotationally biased in the first direction E by the power spring 134, and torque required for the carrier 112 to rotate in the first direction E is smaller than torque required for the sun gear 110 to rotate in the second direction F. Due to this, in returning to its waiting position, as the ring gear 111 rotates in the first direction E, the carrier 112 is rotated in the first direction E while the sun gear 110 is prevented from rotating.

According to the drive apparatus 100 described heretofore, of the driving forces of the two systems, the driving force of the one system can selectively be outputted by the simple configuration in which one of the output elements which are the sun gear 110 and the carrier 112 is selectively fixed so as not to rotate, whereby the drive apparatus can be made small in size, light in weight and low in production cost. Then, the door lock 2 which utilizes this drive apparatus 100 can be made small in size, light in weight and low in production cost.

Then, a gear ratio (an angular velocity of the output element/an angular velocity of the input element) is $-Zc/Za$, where Za is the number of teeth of the sun gear 110, Zc is the number of teeth of the ring gear 111, the ring gear 111 functions as the input element, the carrier 112 is fixed, and the sun gear 110 functions as the output element. As to whether the gear ratio is positive or negative, the gear ratio is positive when the rotational direction of the output element and the rotational direction of the input element are the same, while the gear ratio is negative when the rotational direction of the output element is opposite to the rotational direction of the input element. On the other hand, a gear ratio is $Zc/(Za+Zc)$ when the ring gear 111 functions as the input element, the sun gear 110 is fixed, and the carrier 112 functions as the output element and becomes smaller than an absolute value $Zc/Za$ of a gear ratio between the ring gear 111 and the sun gear 110. Consequently, the sun gear 110 which functions as the first output element to which the releasing cable 29 is connected rotates relatively at high speeds, and the carrier 112 which functions as the second output element to which the closing cable 32 is connected rotates relatively with high torque. In this way, the high speed required for the releasing operation and the high torque required for the closing operation of the lock apparatus 10 are made compatible with each other by the planetary gear mechanism 101, and therefore, the motor 102 can be made small in size, and hence, the drive apparatus which includes the motor 102 can be made smaller in size.

In addition, when the rock apparatus 10 performs the releasing operation, the ring gear 111, which is the input element, is rotated in the first direction E, the carrier 112 functions as the fixed element, and the sun gear 110, which is the output element, is rotated in the second direction F. On the other hand, when the rock apparatus 10 performs the closing operation, the ring gear 111, which is the input element, is rotated in the second direction F, the sun gear 110 functions as the fixed element, and the carrier 112, which is the output element, is rotated in the second direction F. The releasing cable 29 which is connected to the sun gear 110 and the closing cable 32 which is connected to the carrier 112 can be led out of the housing (the case 103 and the cover 104) of the drive apparatus 100 in the same rotational direction based on the characteristics of the planetary gear mechanism 101 in which the ring gear 111 rotates in the same direction while the sun gear 110 and the carrier 112 rotate in the opposite directions, and this facilitates the layout of the releasing cable 29 and the closing cable 32.

The carrier 112 to which the closing cable 32 is connected may be rotationally biased in the first direction E in place of rotationally biasing the sun gear 110 to which the releasing cable 29 is connected in the first direction E. However, it is preferable that the sun gear 110 to which the releasing cable 29 is connected is rotationally biased in the first direction E. The rotational biasing of the sun gear 110 in the first direction E constitutes resistance to pulling on the releasing cable 29, and the rotational biasing of the carrier 12 in the first direction E constitutes resistance to pulling on the closing cable 32. Then, the closing operation accompanied by the movement of the vehicle door 3 requires greater force than force required for the releasing operation. Then, the maximum load of the motor 102 is mitigated by rotationally biasing the sun gear 110 to which the releasing cable 29 is connected in the first direction E, thereby making it possible to make the motor 102 small in size, and the drive apparatus which includes the motor 102 can be made smaller in size.

Heretofore, the ring gear 111 is described as functioning as the input element, and the sun gear 110 and the carrier 112 are described as functioning as the output elements. However, the sun gear 110 can function as the input element, while the ring gear 111 and the carrier 112 can function as the output elements. As this occurs, a gear ratio when the carrier 112 is fixed or functions as a fixed element and the ring gear 111 functions as the output element is $-Za/Zc$, a gear ratio when the ring gear 111 functions as the fixed element and the carrier 112 functions as the output element is $Za/(Za+Zc)$, and the gear ratio $Za/(Za+Zc)$ between the sun gear 110 and the carrier 112 becomes smaller than an absolute value $Za/Zc$ of the gear ratio between the sun gear 110 and the ring gear 111. Namely, the ring gear 111 rotates relatively at high speeds, and the carrier 112 rotates relatively with high torque.

In addition, the carrier 112 can function as the input element, while the sun gear 110 and the ring gear 111 can function as the output elements. As this occurs, a gear ratio when the sun gear 110 functions as the fixed element and the ring gear 111 functions as the output element is $(Za+Zc)/Zc$, and a gear ratio when the ring gear 111 functions as the fixed element and the sun gear 110 functions as the output element is $(Za+Zc)/Za$. Since $Zc>Za$ normally, the gear ratio $(Za+Zc)/Zc$ between the carrier 112 and the ring gear 111 becomes smaller than the gear ratio $(Za+Zc)/Za$ between the carrier 112 and the sun gear 110. Namely, the sun gear 110 rotates relatively at high speeds, and the ring gear 111 rotates relatively with high torque.

What is claimed is:

1. A drive apparatus comprising:
    a sun gear;
    a ring gear disposed coaxially with the sun gear and on an outer side of the sun gear;
    a planetary gear disposed between the sun gear and the ring gear so as to mesh with the sun gear and the ring gear;
    a carrier disposed coaxially with the sun gear and the ring gear, the carrier being configured to support the planetary gear;
    a drive source configured to drive an input element, the input element being one rotary element selected from a group of the sun gear, the ring gear and the carrier; and
    a fixing mechanism configured to fix selectively one of output elements of a first output element and a second output element so as not to rotate, the first output element and the second output element being two rotary elements other than the input element of the sun gear, the ring gear and the carrier,
    wherein the drive apparatus is configured to output driving force from the other output element that is other than the one of output elements of the first output element and the second output element fixed by the fixing mechanism,
    wherein the input element is the ring gear,
    wherein the first output element is the sun gear, and
    wherein the second output element is the carrier.

2. A drive apparatus comprising:
    a sun gear;
    a ring gear disposed coaxially with the sun gear and on an outer side of the sun gear;
    a planetary gear disposed between the sun gear and the ring gear so as to mesh with the sun gear and the ring gear;
    a carrier disposed coaxially with the sun gear and the ring gear, the carrier being configured to support the planetary gear;
    a drive source configured to drive an input element, the input element being one rotary element selected from a group of the sun gear, the ring gear and the carrier; and
    a fixing mechanism configured to fix selectively one of output elements of a first output element and a second output element so as not to rotate, the first output element and the second output element being two rotary elements other than the input element of the sun gear, the ring gear and the carrier,
    wherein the drive apparatus is configured to output driving force from the other output element that is other than the one of output elements of the first output element and the second output element fixed by the fixing mechanism, and
    wherein an absolute value of a gear ratio between the input element and the second output element is smaller than an absolute value of a gear ratio between the input element and the first output element.

3. The drive apparatus according to claim 1,
    wherein a first output cable that is connected to the first output element and a second output cable that is connected to the second output element are let out of a housing of the drive apparatus in the same rotational direction of the first output element and the second output element.

4. The drive apparatus according to claim 1,
wherein a rotational direction of the ring gear when the drive source is rotated forwards is referred to as a first direction when the sun gear, the ring gear and the carrier rotate, and a rotational direction opposite to the first direction is referred to as a second direction,
wherein the fixing mechanism comprises:
   a first engagement portion provided on the sun gear;
   a first stopper that is brought into abutment with the first engagement portion so as to prevent the sun gear from rotating in the first direction;
   a second engagement portion provided on the carrier;
   a second stopper that is brought into abutment with the second engagement portion so as to prevent the carrier from rotating in the first direction; and
   a biasing member configured to rotationally bias the sun gear or the carrier in the first direction, and
wherein the drive source is rotatable forwards and backwards.

5. The drive apparatus according to claim 4,
wherein the biasing member is configured to rotationally bias the sun gear in the first direction.

6. A door lock comprising:
a drive apparatus comprising:
   a sun gear;
   a ring gear disposed coaxially with the sun gear and on an outer side of the sun gear;
   a planetary gear disposed between the sun gear and the ring gear so as to mesh with the sun gear and the ring gear;
   a carrier disposed coaxially with the sun gear and the ring gear, the carrier being configured to support the planetary gear;
   a drive source configured to drive an input element, the input element being one rotary element selected from a group of the sun gear, the ring gear and the carrier; and
   a fixing mechanism configured to fix selectively one of output elements of a first output element and a second output element so as not to rotate, the first output element and the second output element being two rotary elements other than the input element of the sun gear, the ring gear and the carrier,
   wherein the drive apparatus is configured to output driving force from the other output element that is other than the one of output elements of the first output element and the second output element fixed by the fixing mechanism; and
a lock apparatus configured to hold a vehicle door in a fully closed state and a half closed state and to perform a releasing operation, in which the vehicle door staying in the fully closed state or the half closed state is shifted to an openable state, and a closing operation, in which the vehicle door staying in the half closed state is shifted to the fully closed state,
wherein the lock apparatus comprises:
   a latch that is moveable to each of a full latching position where the latch holds the vehicle door in the fully closed state, a half latching position where the latch holds the vehicle door in the half closed state, and an unlatching position where the latch holds the vehicle door in the openable state; and
   a ratchet that is moveable to each of a locking position where the ratchet locks the latch which stays in the full latching position or the half latching position so as to prevent the latch from moving towards the unlatching position and an unlocking position,
wherein in the releasing operation, the ratchet is moved from the locking position towards the unlocking position by means of the driving force which is outputted from the first output element of the drive apparatus,
wherein in the closing operation, the latch is moved from the half latching position towards the full latching position by means of the driving force which is outputted from the second output element of the drive apparatus,
wherein the input element is the ring gear,
wherein the first output element is the sun gear, and
wherein the second output element is the carrier.

* * * * *